Figure 1:

(No Model.) 4 Sheets—Sheet 1.

A. STEINER.
HAND CORN HARVESTER AND HUSKER.

No. 358,496. Patented Mar. 1, 1887.

Witnesses.
W. Rossiter
Otto Luebkert

Inventor
August Steiner
By Wimple Lotz
Atty.

(No Model.) 4 Sheets—Sheet 2.
A. STEINER.
HAND CORN HARVESTER AND HUSKER.
No. 358,496. Patented Mar. 1, 1887.
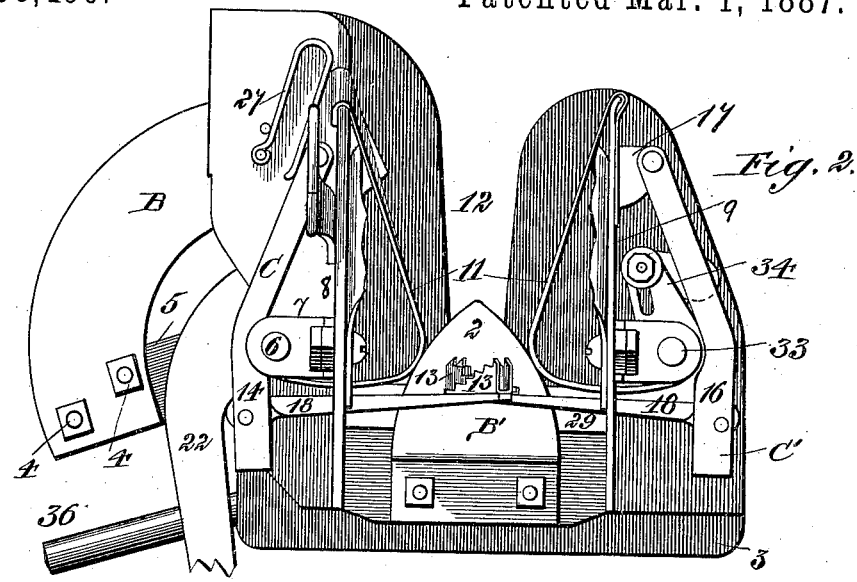
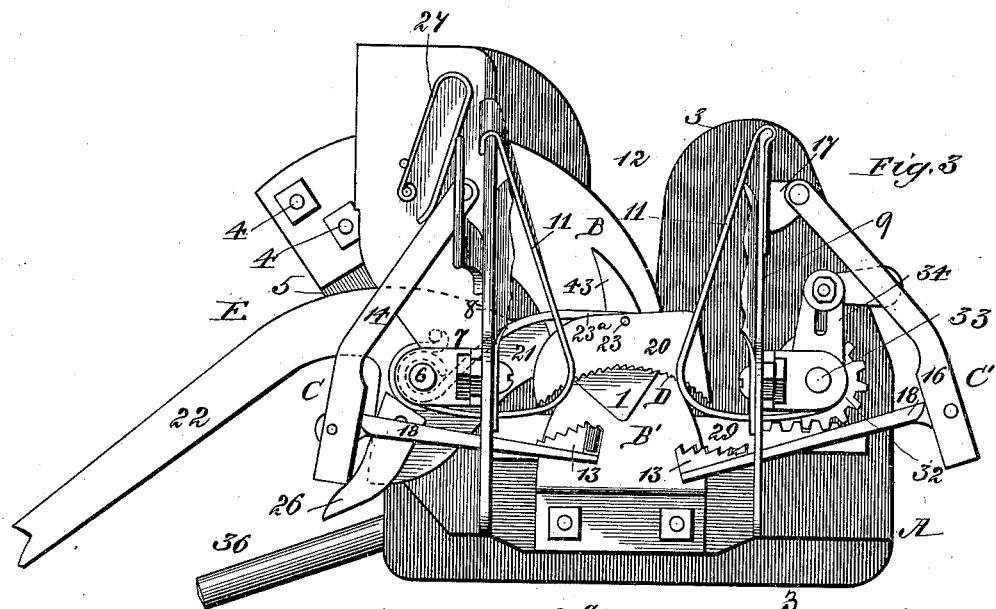
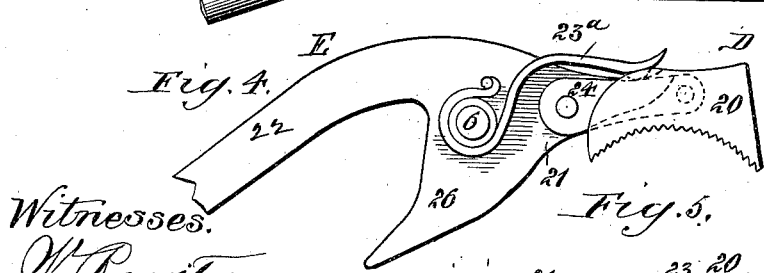
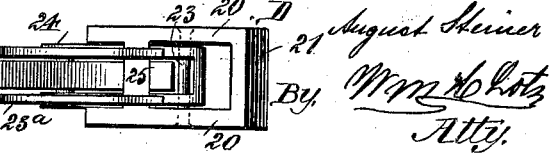
Witnesses.
W. Rossiter
Otto Luebkert
Inventor
August Steiner
By Wm H Lotz
Atty.

(No Model.) 4 Sheets—Sheet 3.
A. STEINER.
HAND CORN HARVESTER AND HUSKER.
No. 358,496. Patented Mar. 1, 1887.
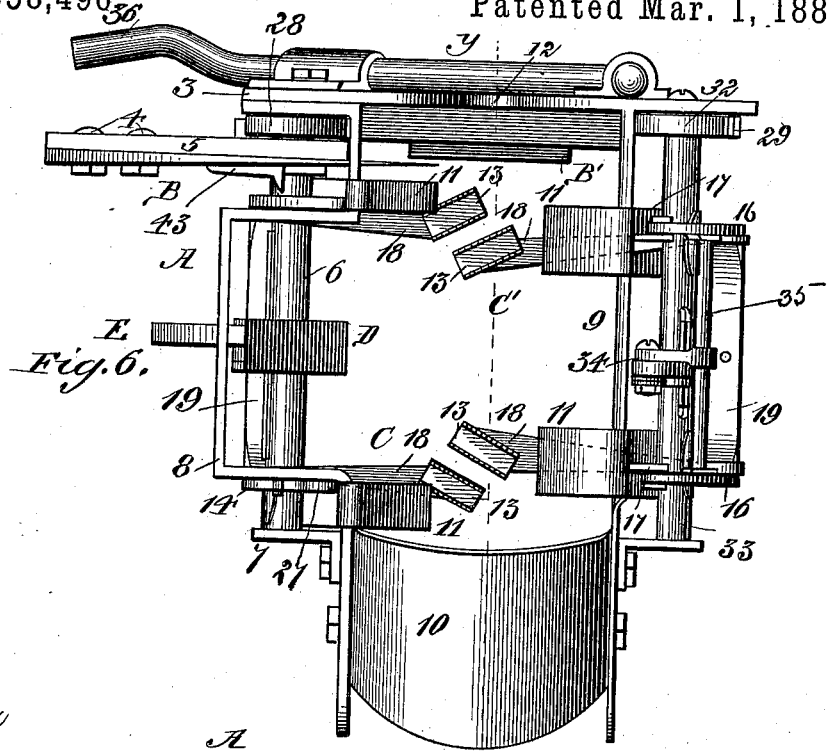
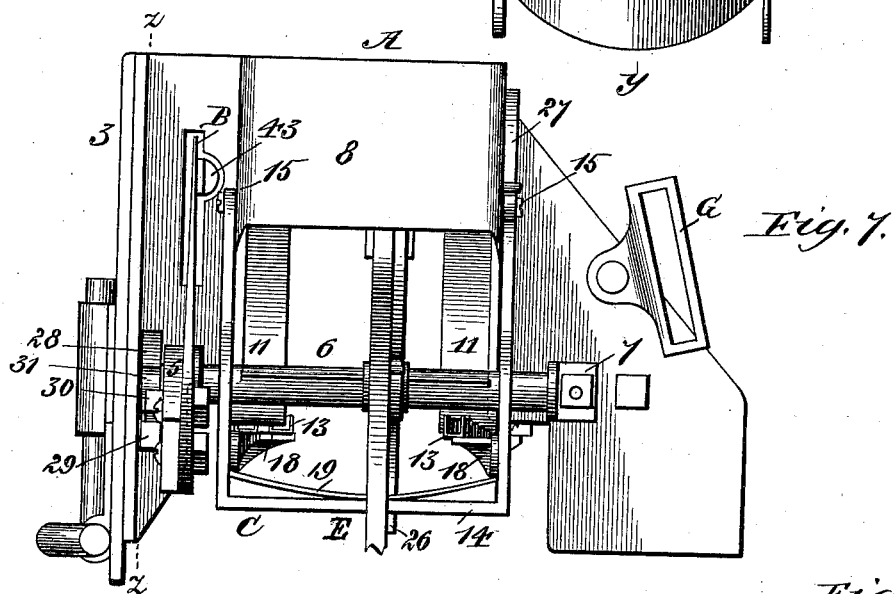
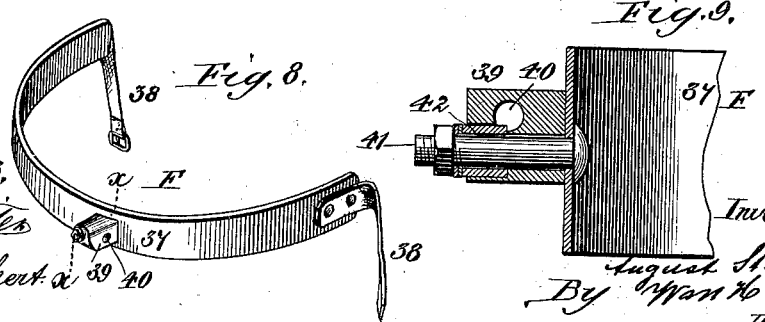

(No Model.) 4 Sheets—Sheet 4.
A. STEINER.
HAND CORN HARVESTER AND HUSKER.
No. 358,496. Patented Mar. 1, 1887.
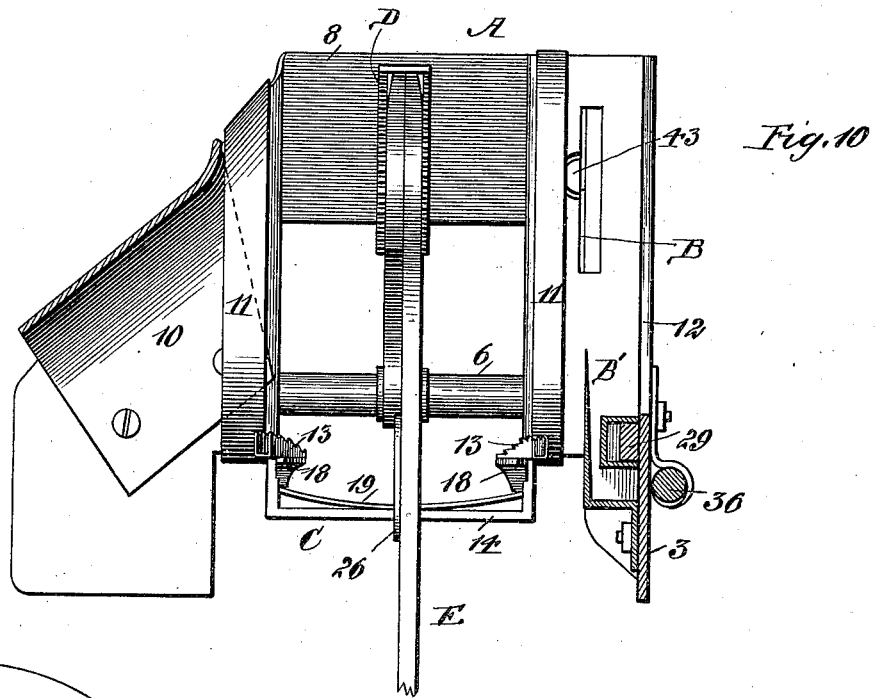
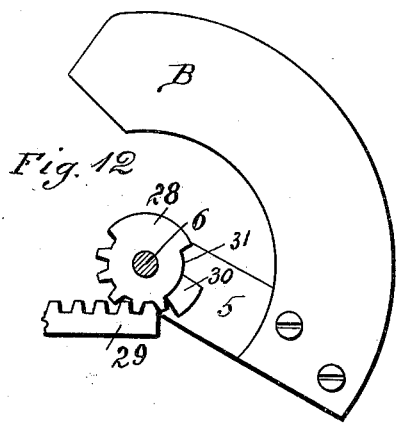
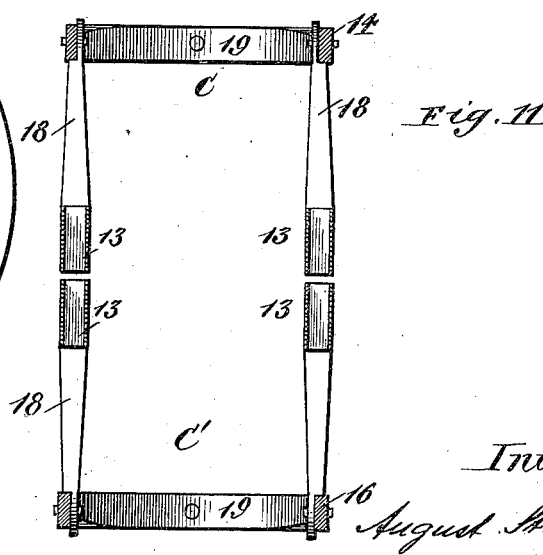
Witnesses.
W. Rossiter
Otto Luebkert
Inventor
August Steiner
By Wm H Lotz
Atty

UNITED STATES PATENT OFFICE.

AUGUST STEINER, OF HOMEWOOD, ILLINOIS.

HAND CORN HARVESTER AND HUSKER.

SPECIFICATION forming part of Letters Patent No. 358,496, dated March 1, 1887.

Application filed August 3, 1886. Serial No. 209,924. (No model.)

*To all whom it may concern:*

Be it known that I, AUGUST STEINER, a citizen of the United States of America, residing at Homewood, in the county of Cook and State of Illinois, have invented certain new and useful Improvements in Hand Corn Harvesting and Husking Machines, of which the following is a specification, reference being had therein to the accompanying drawings.

The object of this invention, generally stated, is to provide a novel and efficient machine adapted for harvesting and husking corn. Other objects, more specifically stated, are to provide novel means for appending a machine for said purpose to the person of the operator, so that it can be carried through the field, and to further adapt said machine so that in place of being thus carried about it can be attached to a wagon or the like; also, to adapt said machine to sever the ear of corn from the stalk without detaching the husk from the latter, and to further adapt it to open the husk and force therefrom the severed ear of corn, whereby the ears of corn may be gathered and the stalks, with the husks thereon, left standing in the field, or when desired the stalks, with the unhusked ears thereon, may be first gathered, and the ear of corn subsequently severed from the stalk and freed from the husk.

To the attainment of the foregoing and other useful ends, the invention consists in matters hereinafter described, and particularly pointed out in the claims.

In the annexed drawings, Figure 1 represents a machine embodying my invention appended to the person of the operator, who is represented in the act of operating the machine for the purpose of severing the ear of corn from the stalk and husking the same, the said unhusked ear being shown in the machine with the outer end of said unhusked ear under the guard 10. In said view a portion of the bag for collecting the husked ears is broken away, in order to show the hand of the operator in the act of grasping and operating the lever by which the machine is worked. Fig. 2 represents what may be termed an "end elevation" with the guard 10 removed, the movable cutter and presser-jaw being in a raised position and the stripping or husking jaws closed. Fig. 3 is a like view with the husking-jaws open and the cutter and presser jaw down. Fig. 4 is a detail representing the presser-jaw and a portion of the main operating-lever, said view including the pivoted yoke 24, which is not shown in Fig. 3. Fig. 5 is a top plan view of Fig. 4. Fig. 6 is a top plan view of the machine. Fig. 7 is a side elevation thereof. Fig. 8 shows, in perspective, a belt by which the machine can be attached to the body of the operator. Fig. 9 is an enlarged detail on the line *x x*, Fig. 8. Fig. 10 is a section on the line *y y*, Fig. 6. Fig. 11 is a plan view of the spring-arms 18 of the husking-jaws, a section being taken horizontally through the yoke-shaped portions 14 and 16 of said jaws. This view shows the toothed portions of said jaws arranged somewhat differently from the toothed portions shown in Fig. 6. Fig. 12 is a sectional elevation on line *z z*, Fig. 7, showing in detail the movable cutter and mutilated gear-wheel.

Referring by letter to the several figures of the drawings, in which like letters and numerals denote like parts, A indicates the frame of the machine, which is provided with bearings appropriate for the several operative members and constructed with reference to the work to be performed, as will hereinafter appear.

The means for severing the ear of corn from the stalk consist of a vibratory or analogously movable blade or cutter, B, and, preferably, a stationary blade, B', arranged to act in conjunction with the movable cutter, which latter, during the act of severing the ear of corn from the stalk, may be brought down in a plane parallel with and alongside of the stationary blade. The cutting portion 1 of the movable cutter and the cutting portion 2 of the fixed cutter are both pointed and sharpened, so as to provide two double-edged pointed blades adapted to sever the ear from the stalk, but not to separate the husk from the latter, the incisions made in the husk from opposite sides thereof being of a length sufficient to sever the ear, but not to cut off the husk. The fixed blade B' is secured to a plate, 3, which forms one of the sides of the main frame, as best shown in Figs. 2 and 3. The segmental-shaped movable blade B is herein shown secured by bolts or rivets 4 to the outer end of a stock, 5, which latter is at its inner end fixed upon a rock-shaft, 6, arranged to have its bearings in the main frame, one end of said shaft being, for example, journaled in the side plate, 3, and the other end journaled in a bearing, 7, secured to a plate, 8, which unites with the side plate, 3, as in Fig. 6, and also serves to provide one of the sides of the main frame. The side of the main frame opposite its said plate or side 8 is formed by a plate, 9, which, like the plate 8, unites with the plate 3, whereby a proximately rectangular frame is provided, with the exception that its side or end opposite plate 3 is open for a portion of the height of the frame, the remaining upper portion of said side or end being occupied by a transversely-arranged curved plate, 10, which connects together the sides 8 and 9, and serves as a guard, hereinafter referred to.

It may be here observed that while I have thus particularly described a certain construction of frame, I do not limit myself to such construction, but have simply particularized these details in order to more clearly explain the arrangement and relative location of other portions of the machine. It is desirable, however, that the frame should constitute or contain a temporary holder for receiving the ear of corn in the husk and for maintaining the same in proper position to be acted upon by the cutters and husking devices, hereinafter specified; and to the attainment of such end said rectangular frame is provided upon its inner side with the two pairs of oppositely-arranged springs 11, which are secured at their upper ends and arranged to converge somewhat toward the lower part of the frame, so as to provide a spring-holder into which the unhusked ear can be placed, the end of the husk, when the same is placed between the two pairs of springs, being passed under the guard 10, as in Fig. 1, wherein the operator is represented as having bent down the stalk and placed the unhusked ear in the machine.

In order to permit the unhusked ear while on the stalk to be placed in the machine, the plate 3 is provided with a vertical slot or opening, 12, arranged opposite the fixed cutter 2, and forming a passage for that portion of the stalk which occurs at the junction of the latter with the ear. Said slot or passage forms, therefore, a guide for directing said portion of the stalk onto the fixed cutter 2 when the unhusked ear is brought down and placed in position within the machine to be acted upon by the movable cutter. By the foregoing arrangement it will be seen that when the unhusked ear is placed within the machine the springs bearing against said unhusked ear from opposite sides thereof will hold and steady the same during the cutting action.

The husking of the ear of corn is accomplished by a pair of vibratory stripping or husking jaws, C and C', which are pivoted to the main frame and provided with toothed portions 13, adapted to engage and tear apart the husk in order to liberate the ear after the latter has been severed from the stalk. These jaws swing laterally to the length of the ear when the latter is in proper position within the machine, and are arranged so that preparatory to the cutting action their toothed portions 13 shall meet under the unhusked ear, the tooth portions of one jaw being alongside of or opposite the ends of the tooth portions of the remaining jaw, in order that when said jaws are swung apart the husk shall be torn apart along its under side, so as to permit the ear, after it has been severed from its stalk, to drop out. As herein constructed, each jaw comprises a yoke-shaped piece pivotally attached at its ends to the main frame, and provided with arms whereon the toothed portions 13 are secured. The ends of the yoke-shaped portion 14 of the jaw C are herein shown pivotally attached to the side 8 of the main frame by the pivots 15, Fig. 7, while the yoke-shaped piece 16 of the jaw C' has its ends pivotally attached to brackets 17, which latter are shown secured to the side 9 of the main frame, as in Fig. 6. The arms 18, which are included in the construction of said jaws, are pivoted to the yoke-shaped pieces 14 and 16, and normally held in a horizontal or proximately horizontal position by springs 19, which are secured to the yoke-shaped pieces and arranged to bear against the said arms. These arms 18 are extended toward the middle of the machine, as illustrated in Fig. 6, and have their toothed portions 13, which are at their inner ends, arranged obliquely to the arms, as in Fig. 6, whereby they can be brought substantially side by side, as shown in said figure, although, if preferred, the lines of teeth or said toothed portions can be in line with said arms, as in Fig. 11, whereby, when the jaws are brought together, the toothed portions of one jaw will be opposite the toothed portions of the other jaw.

As heretofore mentioned, the jaws will be brought together preparatory to the stroke of the movable cutter, said position of the jaws being illustrated in Figs. 2, 6, and 11. As a means for opening the jaws at or about the time the ear has been severed or nearly severed from the stalk, in order to cause said jaws to open the husk, and also as a means for holding down the unhusked ear during the cutting operation, and for forcing the severed ear out from the husk after the latter has been opened, I provide the machine with a presser device or presser-jaw, D, arranged to work alongside of and operate simultaneously with the movable cutter B, said jaw being adapted during the first portion of its stroke to hold down the unhusked ear while the ear of corn is being severed from the stalk, and during the remaining portion of its said stroke to force the severed ear out from the husk. The jaw D is made yoke-shaped, as in Fig. 5—that is to say, it is formed with two flat parallel side portions, 20, united at one end by the end portion, 21. The lower edges of the two sides of said jaw are curved and serrated, as in Figs. 3 and 4, in order to conform to the shape of the unhusked ear and to obtain a reliable hold thereon. Said jaw is arranged to receive or straddle the short arm 21 of a lever, E, which latter is feathered upon the rock-shaft 6, and provided with a handle end, 22, which is to be grasped by the operator, both for the purpose of operating the pressure-jaw and for actuating the rock-shaft 6, in order to also operate the cutter B, that is carried by said rock-shaft.

In Fig. 3 the pivoted jaw is shown as provided with a cross bar or pin, 23, which is secured at its ends in the sides 20 of said jaw, while the lever E carries a spring, 23ª, which at one end bears upon said pin, so as to provide a spring-jaw carried at one end of the vibratory lever. Said spring permits the jaw 20 to yield to some extent to the resistance offered by the unhusked ear, and also permits said jaw to adapt itself to the size and shape of the unhusked ear.

In Figs. 4 and 5 I have shown the serrated jaw D arranged to straddle or receive a yoke-shaped piece, 24, which latter is in turn arranged to straddle and is pivoted to the end portion of the short arm 21 of the vibratory lever. Under such arrangement the jaw D will be provided with a stop, 25, consisting of a cross-piece which connects together the upper edge portions of the sides 20 of the jaw, said stop or cross-piece being arranged over both the pivoted yoke-piece 24 and the short arm 21 of the lever, and being adapted to provide a bearing or abutment on which the free ends of one or more springs, 23ª, can rest. Said springs are attached to the lever E, and are merely a duplication of the spring 23ª, which presses directly upon the pin 23, as shown in Fig. 3, while the two springs 23ª 23ª, as shown in Figs. 4 and 5, press upon the cross-piece 25.

It will be observed that the jaw D is pivoted to that end of the yoke-piece 24 which extends beyond the outer end of the short arm 21 of lever E, in which way the jaw in Figs. 4 and 5, like the jaw of Fig. 3, is susceptible of a rocking movement about its pivot, and at the same time can yield bodily to an excessive or undue resistance, since under such resistance the yoke 24 will be swung up as far as may be necessary to meet the exigencies of the occasion.

It will be understood that most, if not all, of the blades or leaves of the husk are severed from the butt of the ear by the knives B and B', and when the toothed huskers 13 13 tear the husk from the under side of the ear the further pressure of the part D will press the ear out of any husk which may remain upon it. This action is aided by a lug, 43, on blade B, which presses upon the end of the ear.

Thus far the lever E has been considered as a means for raising and lowering its jaw end D, and for further operating the rock-shaft 6, in order to actuate the cutter B. Said lever is, however, also provided as a means for operating the two husking-jaws, and to such end it is provided with a pendent finger, 26, which may either be secured to said lever, as in Fig. 3, or formed integral therewith, as in Fig. 4. This finger 26 is opposite the inner side of the yoke-shaped piece 14 of the husking-jaw C—that is to say, it is in point of location nearest the middle of the machine—and is adapted to engage and swing said jaw C outwardly when the lever E is operated in a direction to cause the cutter B and the serrated jaw D to descend. In order to swing the jaw C back during a reverse movement of said lever, and also to maintain said jaw in contact with the arm or finger 26 of the vibratory lever, the jaw C is spring-controlled by the action of a spring, 27, which is attached to the main frame of the machine and arranged to act against the swinging yoke-shaped piece 14 of said jaw, as best shown in Figs. 2 and 3.

The jaw C' is positively operated from the lever E, through the medium of the rock-shaft 6 and a connecting mechanism, substantially as follows: Loose upon the rock-shaft 6, at a point conveniently alongside the vibratory stock 5 of the movable cutter, is a mutilated gear, 28, which is at all times in mesh with a sliding reciprocatory rack-bar, 29. The vibratory cutter-stock 5, which is keyed or otherwise secured upon rock-shaft 6, is provided with a laterally-projecting lug, 30, arranged to extend into the oblong notch 31, which is formed along the untoothed peripheral portion of the loose gear 28. By reason of such arrangement the rock-shaft 6 can have a certain extent of movement in either direction without operating the gear 28, since the operation of the latter is effected by the engagement of the lug 30 on the vibratory cutter-stock with either end wall of the notch 31, said end walls being in the nature of stops or abutments. The object of this portion of the mechanism will be set forth farther on.

The loose gear, when in positive engagement with the rock-shaft, as hereinbefore specified, serves to operate the rack-bar 29, which latter slides along the inner wall of the end or side 3 of the main frame, and serves in turn to operate a gear, 32, that is fixed upon a rock-shaft, 33. The rock-shaft 33 is journaled in the main frame of the machine, or in any appropriate bearing attached thereto, and is situated opposite the side 9 of said main frame. Said rock-shaft is connected with the jaw C' by a jointed link or toggle-joint, 34, which has its two portions adjustably pivoted together, as in Figs. 2 and 3, so that the swing of the jaw C', incident to the movement of rock-shaft 33, can be determined. One end of said toggle is attached to rock-shaft 33 in any suitable way, while the other end of said toggle is desirably attached to a cross bar, 35, which, as shown in Fig. 6, connects together the two sides of the swinging yoke-piece 16 of the husking-jaw C'.

Desirably the jaws C and C' are opened or swung apart simultaneously, said jaws being thrown farthest apart when the pivoted spring presser-jaw D is in its lowest position, said jaw D having followed the ear down after the huskers 13 13 have parted sufficiently to let the ear pass to rid it of the husks and throw it out of the machine. This is due to the arrangement of stud 30, which, when the finger 26 commences to swing out jaw C, acts to operate the loose gear 28. This lug 30 is placed upon the stock 5 with reference to the other moving parts, and its action is timed to make the action of the gear 28 come at the proper moment. When the presser-jaw is raised from its lowest position, the husking-jaw C closes simultaneously with said operation; but during this time the husking-jaw C' remains stationary until the stud traverses the notch 31 in the loose gear and is again brought into engagement with the latter, so as to operate the same, and thereby pull back the sliding rack-bar, this latter action serving, of course, to close the husking-jaw C'.

The lever E is feathered on rock-shaft 6, so as to slide toward either end thereof, in which way the pressure-jaw can be set for different lengths or sizes of ears of corn, it being understood that different kinds of corn have a different average of length and size.

The machine thus described can be carried round the field by the operator, or can be attached to a wagon or other support. In the one instance the corn can be harvested and the stalks, with the husks, left standing in the field, while in the other the stalks can be cut off and the ears of corn severed and collected in a wagon or other receptacle.

Fig. 1 represents the machine appended to the person of the operator. To such end the main frame is provided with a fixed shank or stem, 36, conveniently formed by a bent rod secured to the end or side 3 of the main frame by metal straps or clamps. This stem or shank can be fitted in a socket attached to a wagon or the like, although in the present instance it is connected with a belt, F, designed to be fastened round the waist of the operator. Fig. 8 represents the said belt as consisting of a half-loop, 37, of spring metal, provided with straps 38, by which it can be fastened. To the front of the metal portion of this belt is attached a perforated block or socket-piece, 39, which is provided with a hole or socket, 40, to receive the shank 36 of the machine. This socket-piece is held by a bolt, 41, which passes through both the belt and the socket-piece, and also through a sleeve, 42, which latter is received within a recess formed in the said socket-piece. The socket-piece can be turned so as to adjust the machine to the desired position, and the socket-piece then placed in rigid connection with the belt by tightening up a nut on the end of the bolt. The recess for the sleeve 42 opens to some extent into the hole or socket 40, so that when the nut is tightened up a portion of the sleeve can be forced into said socket 40, to there bind against and firmly hold the shank 30 when the latter is in place within the socket. The main frame is further provided with a loop, G, pivoted to the frame and serving to connect with the latter a cord or strap, H, which can be passed round the neck of the operator, as in Fig. 1.

In operating this machine the unhusked ears are placed in the machine and the lever operated to cause the ear of corn to be severed from the stalk by the cutters, the husk to be opened by the husking-jaws, and the ear to be forced out by the presser-jaw.

Where the machine is carried as in Fig. 1, the operator can carry a bag arranged under the machine so as to collect the ears as they are freed from the husks.

The cutter B is provided with a laterally-arranged lug, 43, which during the stroke of the cutter will also assist the pressure-jaw D in forcing down the unhusked ear against the yielding husking or stripping devices. In this connection it will be observed that since the arms 18 of said stripping or husking jaws or devices are pivoted and held up in a horizontal position by means of springs they will, during the husking operation, adapt themselves to the shape of the ear.

What I claim as my invention is—

1. A machine for harvesting and husking corn, comprising a cutting mechanism for severing the ear from the stalk, combined with transversely-reciprocating husking-jaws for opening the husk, and a single operating-shaft and connections, as described, for actuating said cutting mechanism and husking-jaws to cause them to act upon the ear simultaneously, substantially as described.

2. The combination, with the cutting mechanism and husking-jaws adapted for opening the husk of an ear of corn, of the presser-jaw for forcing the ear out from the opened husk, substantially as described.

3. The jaws C and C', provided with spring-controlled pivoted arms 18, having toothed portions 13, in combination with means for severing the ear from the stalk and means for opening and closing said jaws, substantially as described.

4. The combination, with cutting mechanism and the husking-jaws for opening the husk, of the vibratory lever provided with a pivoted presser-jaw, D, substantially as described.

5. The combination, with the vibratory lever E, of the spring-controlled presser-jaw D, and a yoke-piece, 24, which is pivoted to said lever, and has the said presser-jaw D pivoted to it, substantially as described.

6. The combination, with the husking-jaws, of the vibratory lever adapted to engage one of said jaws, and connecting mechanism between said lever and the other husking-jaw, whereby both jaws may be opened simultaneously, substantially as described.

7. The combination, with rock-shaft 6 and means for operating the same, of the sliding rack, the mutilated gear 28, a rock-shaft, 33, having a gear upon it, and the jaw C', connected with said rock-shaft 33, substantially as described.

8. The vibratory husking-jaws hung to open and close, and a holder for temporarily holding an unhusked ear of corn, in combination with the movable cutter for severing the ear from the stalk, a presser-jaw, and a rock-shaft from which said presser-jaw is suspended, and which also carries the movable cutter, substantially as described.

9. The combination, with a rock-shaft, the movable cutter and the lever E, both carried by the said rock-shaft, of the pivoted presser-jaw carried by said lever, the husking-jaws, and intermediate devices by which the jaws are operated from said lever, substantially as described.

10. The combination, with a hand-machine for harvesting and husking corn, having the shank or stem 36, of a belt to be placed upon the person of the wearer, adjustable socket-piece 39, having bolt 41, having a nut, as described, and sleeve 42 on said bolt, all substantially as and for the purpose set forth.

11. The combination, with the husking-jaws, of the cutting mechanism for severing the ear of corn from the stalk, and the presser-jaw D, a lever carrying said jaw feathered upon rock-shaft 6, and adjustable upon said shaft in a direction toward or away from the movable cutter, substantially as described.

12. The combination, with the cutting mechanism for severing the ear of corn from the stalk without detaching the husk from the latter, of the husking or stripping jaws for opening the husk, and the lug 43, applied to the movable cutter and adapted for pressing down the ear, substantially as described.

In testimony whereof I affix my signature in presence of two witnesses.

AUGUST STEINER.

Witnesses:
WM. H. LOTZ,
OTTO LUEBKERT.